United States Patent [19]

Weinheimer et al.

[11] Patent Number: 5,349,984
[45] Date of Patent: Sep. 27, 1994

[54] CHECK VALVE

[75] Inventors: Jacek M. Weinheimer, Treasure Island; Michael T. Taylor, St. Petersburg; Terrence C. Allen, Clearwater, all of Fla.

[73] Assignee: Halkey-Roberts Corporation, St. Petersburg, Fla.

[21] Appl. No.: 8,452

[22] Filed: Jan. 25, 1993

[51] Int. Cl.⁵ .............................................. F16K 15/06
[52] U.S. Cl. .......................... 137/543.21; 137/543.17; 251/337
[58] Field of Search .............. 137/540, 543.17, 543.23; 251/337; 604/247

[56] References Cited

U.S. PATENT DOCUMENTS

| | | | |
|---|---|---|---|
| 2,960,998 | 11/1960 | Sinker | 137/543.23 X |
| 3,025,874 | 3/1962 | Yocum | 137/540 |
| 4,665,943 | 5/1987 | Medvick | 137/543.17 |
| 4,681,132 | 7/1987 | Lardner | 137/843 X |
| 4,805,664 | 2/1989 | Mattei | 137/543.23 |
| 4,953,589 | 9/1990 | Nakamura | 137/543.23 |
| 5,098,405 | 3/1992 | Peterson | 604/247 |

Primary Examiner—Robert G. Nilson
Attorney, Agent, or Firm—Dominik, Stein, Saccocio, Colitz & VanDerWall

[57] ABSTRACT

A check valve having a presettable cracking pressure. The check valve employs a spring-loaded valve element in which the compression spring and valve element are held into position in the valve body by means of an apertured plug.

1 Claim, 7 Drawing Sheets

CHECK VALVE

BACKGROUND OF THE INVENTION

1. Field of the Invention

This invention relates to check valves. More particularly, this invention relates to check valves having a pre-set cracking pressure.

2. Description of the Background Art

Presently, there exist many types of check valves designed to control the one-way flow of a fluid therethrough. More particularly, one predominant type of check valve comprises a ball reciprocatingly positioned within a caged area of a fluid passageway. The flow of fluid in one direction through the passageway is uninhibited (unchecked) as it flows around the ball to exit the passageway. However, in the opposite direction, the flow of fluid forces the ball against a valve seat, thereby inhibiting (checking) the flow of fluid therethrough. Many variations of this basic embodiment of a check valve have been developed over the past many decades that check valves have been in use, each having certain advantages when used in certain applications.

In one application area, check valves, commonly referred to as "catheter" check valves, have been developed to control the one-way flow of a fluid into an inflatable bulb of a catheter or endotracheal tube or in similar relatively low-pressure applications. Indeed, due to the relatively low back pressure exerted on the valve element to urge it against the valve seat, it is usually desirable to provide means for constantly urging the valve element against the valve seat such that the valve remains closed when little or no back pressure is present. Consequently, check valves of this nature have a pre-set cracking pressure which must be exerted on the valve element to unseat itself from the valve seat allowing the flow of the fluid in the unchecked direction, For example, U.S. Pat. No. 3,831,629, the disclosure of which is hereby incorporated by reference herein, discloses a check valve comprising a valve element which is constantly urged in sealing engagement with a valve seat thereby maintaining the valve in a closed condition even during the complete absence of back pressure exerted on the valve. Moreover, a certain amount of forward cracking pressure must be exerted on the valve element in the unchecked direction to unseat the valve element, allowing the flow of fluid therethrough. As illustrated and discussed in said patent, such positive cracking pressure may be overcome by means of a mechanical instrument, such as a syringe, by fluid pressure, or by combination of the same.

After more than a decade of experience with the check valve disclosed in said patent, the Assignee of said patent and of this application, has realized that there are some disadvantages associated with the check valve manufactured in accordance with that patent. First, while the valve element may be mass-produced for use in a large variety of valves, differently dimensioned valve bodies or valve elements must be produced in order to provide a variety of valves having different cracking pressures. Consequently, a significant inventory of injection molds and related equipment must be continually developed depending upon the needs of each particular customer. Thus, the ability to provide check valves of this nature with different degrees of cracking pressures necessarily results in an increase in the cost of manufacture because of the inability to produce a universal body usable in conjunction with a universal valve element to produce different valves having different cracking pressures.

In view of the foregoing, there existed a need for a check valve which permitted a universal-size valve element to be positioned into a universal-sized valve body in such a manner that the check valve could be assembled with different cracking pressures. As set forth in U.S. Pat. No. 4,681,132, the disclosure of which is hereby incorporated by reference herein, this need was satisfied by the discovery of a specially configured apertured plug positioned in the output passageway of the check valve. During production, plugs of a different size could be positioned in the output passageway so as to increase or decrease the distance between the plug and the valve seat of the valve housing, thereby decreasing or increasing, respectively, the amount of cracking pressure necessary to open the valve. The check valve employing differently-sized plugs as set forth in U.S. Pat. No. 4,681,132 has enjoyed wide commercial success because of the ability to more precisely set the cracking pressure of the valve.

The above-referenced patents owned by this Assignee further disclose various embodiments of the valve element itself. For example, as shown in FIGS. 5–8 of U.S. 3,831,629, it is seen that the valve element may comprise a substantially cylindrical-wall configuration (FIG. 5), a three point star-configuration (FIGS. 6 and 7), or a bellows configuration (FIG. 8). A similar star-configuration of a valve element is illustrated in U.S. Pat. No. 4,429,856. A similar valve element having a bellows configuration is disclosed in U.S. Pat. No. 3,385,301. Finally, in U.S. Pat. No. 3,192,949, there is disclosed a valve element having an elongated stem composed of a resilient, porous-form plastic material. Each of these configurations are intended to, on the one hand, assure that the valve seat of the valve element is urged into sealing engagement with the valve seat of the valve housing and, on the other hand, to permit the check valve to be opened (cracked) when sufficient force is exerted on the valve element, either fluidly or mechanically by means of a syringe or the like inserted into the check valve.

It is an object of this invention to provide an improvement which overcomes the aforementioned inadequacies of the prior art devices and provides an improvement which is a significant contribution to the advancement of the check valve art.

SUMMARY OF THE INVENTION

For the purpose of summarizing this invention, this invention comprises various embodiments of improved check valves having presettable cracking pressures. In one set of embodiments, the improved check valves employ spring-loaded valve elements. In each embodiment, the valve element and the compression spring are held into position in the valve body by means of an apertured plug. In another embodiment, the need for an apertured plug is eliminated by capturing the compression spring between a protuberance on the inside of the valve body and a snap ring positioned about the valve element. The use of a compression spring in these embodiments assure that the cracking pressure necessary to open the check valve is very accurately predetermined for a given back pressure.

In other embodiments of the check valve of this invention, the valve body includes an input composed of a resilient material which forms a better seal with the tip of a medical syringe or other instrument. Specifically, unlike prior art check valves, the tapered portion of the input resiliently forms about the tip of a medical syringe as the medical syringe is inserted further and further at their end. A seal is therefore formed about a substantial portion of the outer surface of the tip of the syringe, irrespective of the variations in the types of tips and/or the manufacturing tolerances of the tips.

Finally, in still other embodiments of this invention, the check valve of this invention comprises a valve element having a star-shaped configuration with rounded tips, rather than the square tips illustrated in U.S. Patent 3,831,629. Coupled with flutes positioned on the lumen of the axial passageway of the valve body, the round tips of the star-shaped valve element assures that the element will not lodge when the deformed in use and then be jammed in place when the syringe tip is removed.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIGS. 9–13 are partial cross-sectional views of various embodiments of an improved valve body, wherein the input of the valve body is composed of a resilient material which accommodates a variety of sizes of syringe tips and/or variances in manufacturing tolerances to thereby form a better seal with the tip of the medical syringe when inserted therein; FIG. 9 illustrating the valve body molded by two component molding, FIGS. 10 and 11 illustrating the input and the output being molded separately and then snapped together, and FIGS. 12 and 13A and 13B illustrating the valve body being molded entirely of the resilient material and including an outer sleeve composed of a rigid material positioned over the output of the valve body for adding rigidity to the valve body;

Similar reference characters refer to similar parts throughout the several views of the drawings.

DETAILED DESCRIPTION OF THE PREFERRED EMBODIMENT

The present invention comprises many new embodiments of check valves having various features which satisfy the particular needs in the industry. The following description broadly categorizes the check valves according to their respective features. However, in each of these embodiments, the check valve 10 of the invention comprises a valve body 14 comprising a sleeve-like integral configuration with a central axial passageway 20 therethrough defining input 22 and output 24. A valve element 12 is reciprocatably positioned within passageway 20 to check the flow of fluid therethrough from its input 22 to its output 24.

Compression Spring Embodiments with Apertured Plug

FIGS. 1–7 illustrate an improved check valve 10 of the invention which employs valve element 12 operatively positioned within a valve body 15 by means of a compression spring 16 and an apertured plug 18.

As shown in FIGS. 1–6, in some embodiments, the valve element 12 comprises a reduced diameter portion 26 and an increased diameter portion 28 joined together at a forwardly converging frustro-conical valve seat 30. Correspondingly, the lumen of the axial passageway 20 comprises a reduced diameter portion 32 and an increased diameter portion 34 joined together at a forwardly converging frustro-conical valve seat 36. Valve element 12 is positioned within the axial passageway 20 such that its valve seat 30 is matable against the valve seat 36 of the body 14 to create an airtight seal therebetween.

Similar to U.S. Pat. No. 4,681,132, the valve element 12 and the compression spring 16 are retained in position within the axial passageway 20 by means of a symmetrical plug 38. As shown in FIGS. 1–5, plug 38 comprises a symmetrical design such that the plug 38 can be inserted into the passageway 20 without concern for proper orientation during assembly. The symmetrical plug 38 comprises an annular ring 40 which is engageable within a corresponding annular slot 42 formed within the lumen of the sleeve-like valve body 14. A pair of diametrical vanes 44 and 46, positioned ninety degrees with respect to one another, are integrally formed within the annular ring 40 such that fluid flowing through the passageway 20 flows through the four quadrants or apertures defined by the respective vanes 44 and 46 and the annular ring 40. Each of the vanes 44 and 46 comprise a lower annular platform portion 48 and an upper annular platform portion 50 joined at sloping edge 52. The lower corner 54 formed between the sloping edge 52 and the lower platform portion 48 is formed at a diameter substantially equal to the inside diameter of the compression spring 16. With such dimensions, it should be appreciated that the sloping edge 52 of the vanes 44 and 46 of the plug 38 function to centrally locate the rearward end of the compression spring 16 within the axial passageway 20 of valve 10.

Correspondingly, in these embodiments, the valve element 12 comprises, at its rearward end, a lower and upper platform positions 56 and 58 joined at the sloping edge 60. The lower corner 62 formed between the sloping edge 60 and the lower platform portion 56 is formed at a diameter substantially equal to the inside diameter of the compression spring 16 so as to centrally locate the forward end of the compression spring 16 within the axial passageway 20. It is noted that the compression spring 16 may be diametrically tapered inwardly or outwardly along its length. In such applications, the diameters defined by corners 54 and 62 of the plug 38 and the valve element 12 should be correspondingly increased or decreased.

Each of these embodiments of the check valve 10 of the invention are assembled by simply inserting the valve element 12 into the axial passageway 20, inserting the compression spring 16 into the axial passageway 20, and then snapping into place the symmetrical plug 38 into the axial passageway 20 until the plug's annular ring 40 engages into the annular slot 42. It is noted that the spring tension of the compression spring 68 determines the amount of cracking pressure necessary to open the valve 10. Preferably, the compression spring 16 comprises a linearly constant spring tension; however, without departing from the spirit and scope of this invention, compression spring 16 may comprise increasing or decreasing spring tensions dependent upon the degree in which the compression spring 16 is compressed, The specific embodiment of the check valve 10 of the invention illustrated in FIGS. 1 and 2 comprises a contoured output end 64 for easily receiving a tube thereabout. It is noted that a flanged mounting extending from the outside of the valve body 10, as shown in FIG. 2 of U.S. Pat. No. 4,681,132, may be provided for gripping about the tube after insertion therein. A stop ring 66 may be annularly formed about the valve body 14 to properly locate the tube along the length of the body 14.

Figure 1:
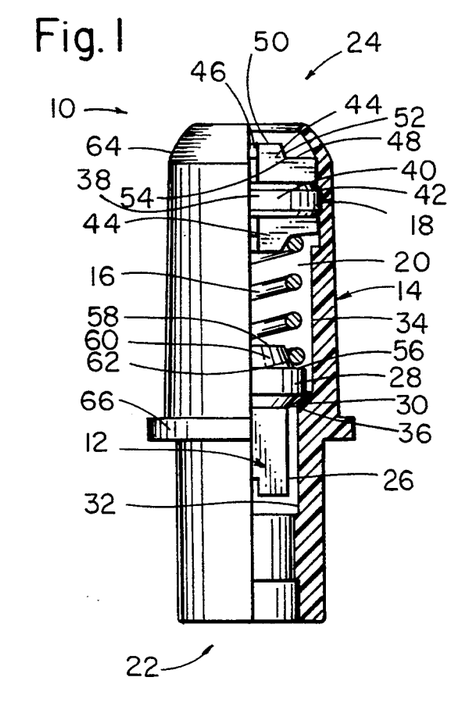
FIG. 1 is a partial cross-sectional view of one embodiment of the check valve of the invention comprising a valve element operatively positioned within a valve body by means of a compression spring and apertured plug, wherein the valve body includes a contoured output for easy insertion within a tube and an input end for receiving the tip of a medical syringe.
Figure 2:
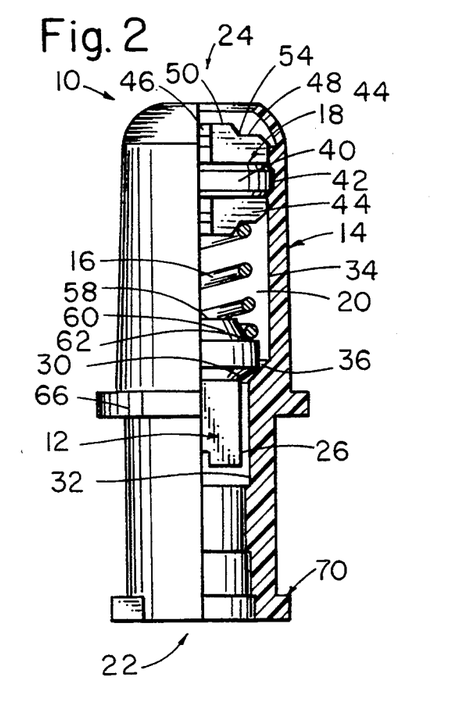
FIG. 2 is a partial cross-sectional view of another embodiment of the check valve of the invention comprising a valve element operatively positioned within a valve body by means of a compression spring and apertured plug, wherein the valve body includes a contoured output end for easy insertion within a tube and an input end including a standard female luer lock fitting for receiving a conventional medical syringe having a corresponding male luer lock fitting about its tip.

The input 22 of the axial passageway 20 may be configured in a step configuration as shown in FIG. 1 for sealingly receiving the tip of a conventional medical syringe. Furthermore, as shown in FIG. 2, the outside of the valve body 14 may include a standard female luer lock fitting 70 for receiving a conventional medical syringe having a corresponding male luer lock fitting about its tip.

Figure 3:
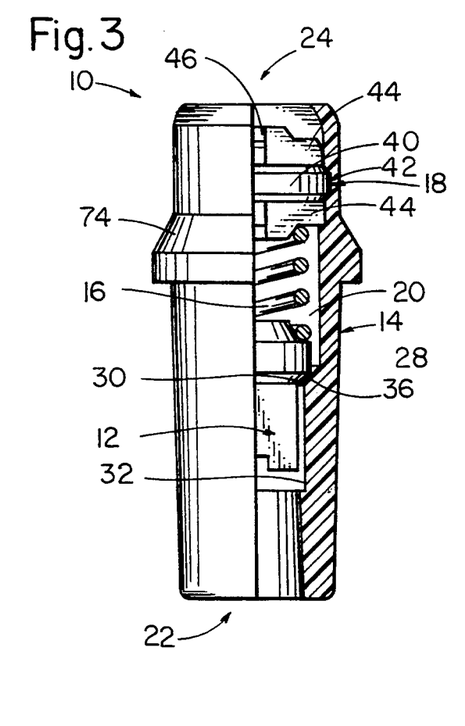
FIG. 3 is a partial cross-sectional view of another embodiment of the check valve of the invention comprising a valve element operatively positioned within a valve body by means of a compression spring and apertured plug, wherein the valve body comprises a rearwardly sloping annular ring that permits the valve to be inserted into a tube and not easily removed therefrom.
Figure 4:
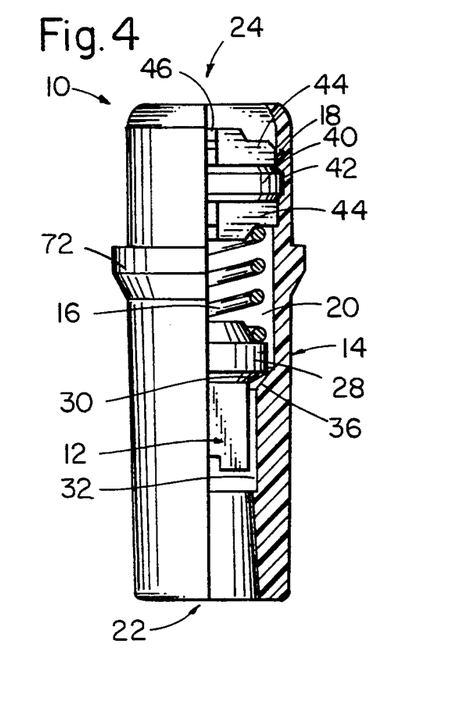
FIG. 4 is a partial cross-sectional view of another embodiment of a check valve of the invention comprising a valve element operatively positioned within a valve body by means of a compression spring and an apertured plug, wherein the valve body includes a forwardly sloping annular ring which facilitates a snap-on clamping sleeve as shown in U.S. Pat. No. 4,776,369.

As shown in FIGS. 3 and 4, in lieu of the stop ring 66, the outside of the valve body 14 may include a rearwardly sloping annular ring 72 or a forwardly sloping annular ring 74, respectively. The rearwardly sloping annular ring 72 of FIG. 3 permits the valve 10 to be inserted into a tube so that fluid may flow into the tube, but fluid flow from the tube is checked. The sharp corner 76 of the annular ring 72 prevents the valve 10 from being removed from the tube. The forwardly sloping annular ring 74 of FIG. 4 facilitates a snap-on clamping sleeve as shown in U.S. Pat. No. 4,776,369, the disclosure of which is hereby incorporated by reference herein.

Figure 5:
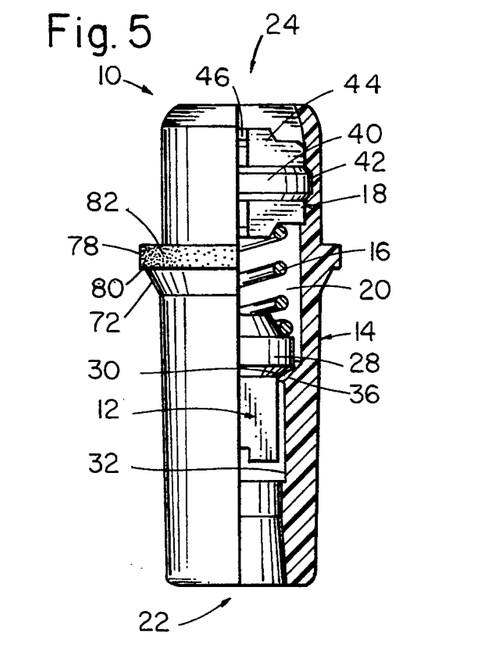
FIG. 5 is a partial cross-sectional view of another embodiment of a check valve of the invention comprising a valve element operatively positioned within a valve body by means of a compression spring and an apertured plug, wherein the annular ring of the embodiment shown in FIGS. 3 and 4 may be of a slightly increased diameter and may comprise a roughened surface to form a better seal with the lumen of the tube in which it is inserted.

As shown in FIG. 5, the cylindrical portion 78 of the annular rings 72 and 74 may be of a slightly increased diameter so as to form an additional corner 80. Also, the cylindrical portion 78 may comprise a roughened surface 82 to form a better seal with the lumen of the tube.

Figure 6:
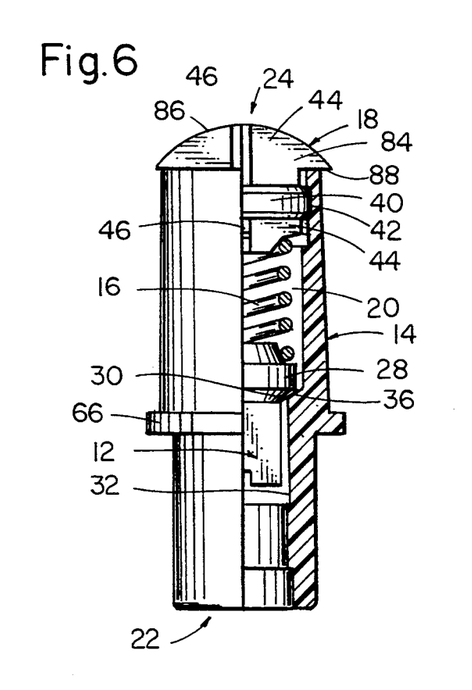
FIG. 6 is a partial cross-sectional view of another embodiment of the check valve of the invention comprising a valve element operatively positioned within a valve body by means of a compression spring and an apertured plug, wherein the apertured plug is asymmetrical and includes a sloped, bullet-shaped configuration to facilitate insertion within a tube.

Finally, as shown in FIG. 6, the apertured plug 18 comprises an asymmetrical plug 84, similar in construction to the symmetrical plug 38, having perpendicularly disposed vanes 44 and 46 integrally formed with the annular ring 40. However, vanes 44 and 46 comprise a sloped, bullet-shaped configuration 86 which facilitates insertion within a tube. The bullet-shaped configuration 86 may be of a slightly increased diameter relative to the diameter of the valve body 14 so as to define a sharp corner 88 at each of the vanes 44 and 46. The sharp corners 88 preclude removal of the valve 10 after insertion within a tube.

Figure 7:
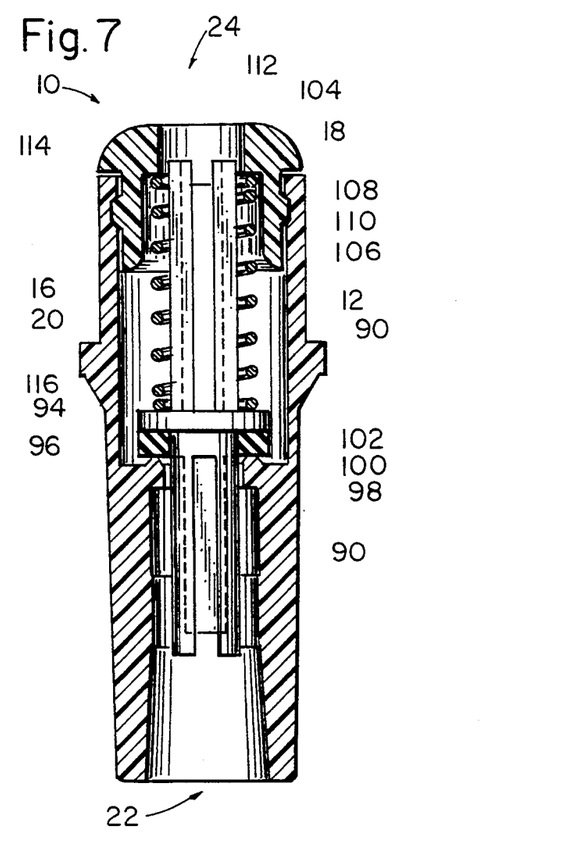
FIG. 7 is a cross-sectional view and FIG. 7A is an input end view of another embodiment of the check valve of the invention comprising an elongated valve element operatively positioned within a valve body by means of a compression spring and an apertured plug, wherein the valve element comprises an annular disk-shaped ring on which is seated an annular gasket and wherein the apertured plug comprises a bullet-shaped annular ring having depending legs which extend into the output of the axial passageway of the valve body.
Figure 7A:
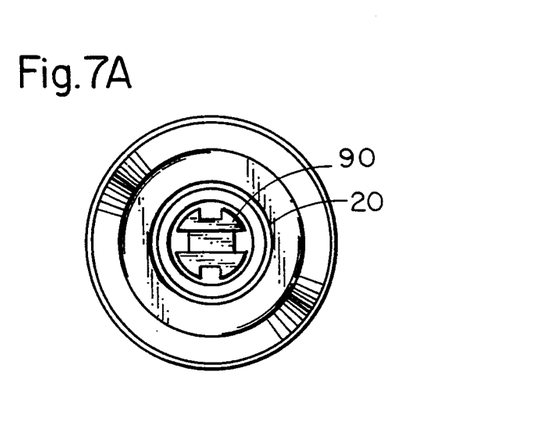

As shown in FIG. 7, in another embodiment, valve element 12 comprises an elongated configuration 90 having a cross cross-sectional configuration as illustrated in FIG. 7A. An annular disk-shaped ring 92 is formed integrally with the elongated configuration of the valve element 90 and includes a diameter which is appreciably greater than the diameter of the elongated configuration 90 of the valve element so as to define a platform 94 on which is seated an annular gasket 96.

Correspondingly, the axial passageway 20 of the valve body 40 comprises a reduced diameter portion 98 of a diameter only appreciably greater than the diameter of the elongated configuration 90 of the valve element 12. The reduced diameter portion 98 comprises inwardly extending annular valve seat 100 for sealing engagement with gasket 96. It is noted that the annular valve seat 100 preferably comprises sloping side walls 102 to assure that an adequate seal with gasket 96 is formed even after considerable wear.

The valve element 12 is resiliently urged toward the annular valve seat 100 of the valve body 14 by means of the compression spring 16 positioned concentrically about the elongated body 90 and secured in position by means of the apertured plug 18. However, in this embodiment, apertured plug 18 comprises a bullet-shaped annular ring 104 having depending legs 106 which extend into the output 24 of the axial passageway 20. Preferably, each of the legs 106 includes an outwardly extending protrusion 108 which resiliently engage into a corresponding annular groove 110 formed on the lumen of the output 24 of the axial passageway.

It is noted that the apertured plug 18 in this embodiment includes hole 112 which is of sufficient size to permit the elongated configuration 90 of the valve element 12 to extend therethrough. However, the diameter of hole 112 is sufficiently small so as to retain the compression spring 16 against its undersurface 114. Correspondingly, it is noted that the annular ring 92 of the elongated configuration 90 of the valve element 12 is of sufficient diameter to define platform 116 on the side opposite to the gasket platform 94, which is appreciably greater than the diameter of the compression spring 16. The compression spring 16 is captured between the plug 18 and the annular ring 92 in such a manner that the gasket 96 is resiliently urged into sealing engagement with the annular valve seat 100 of the valve body 14.

Compression Spring Embodiment Without Apertured Plug

Figure 8:
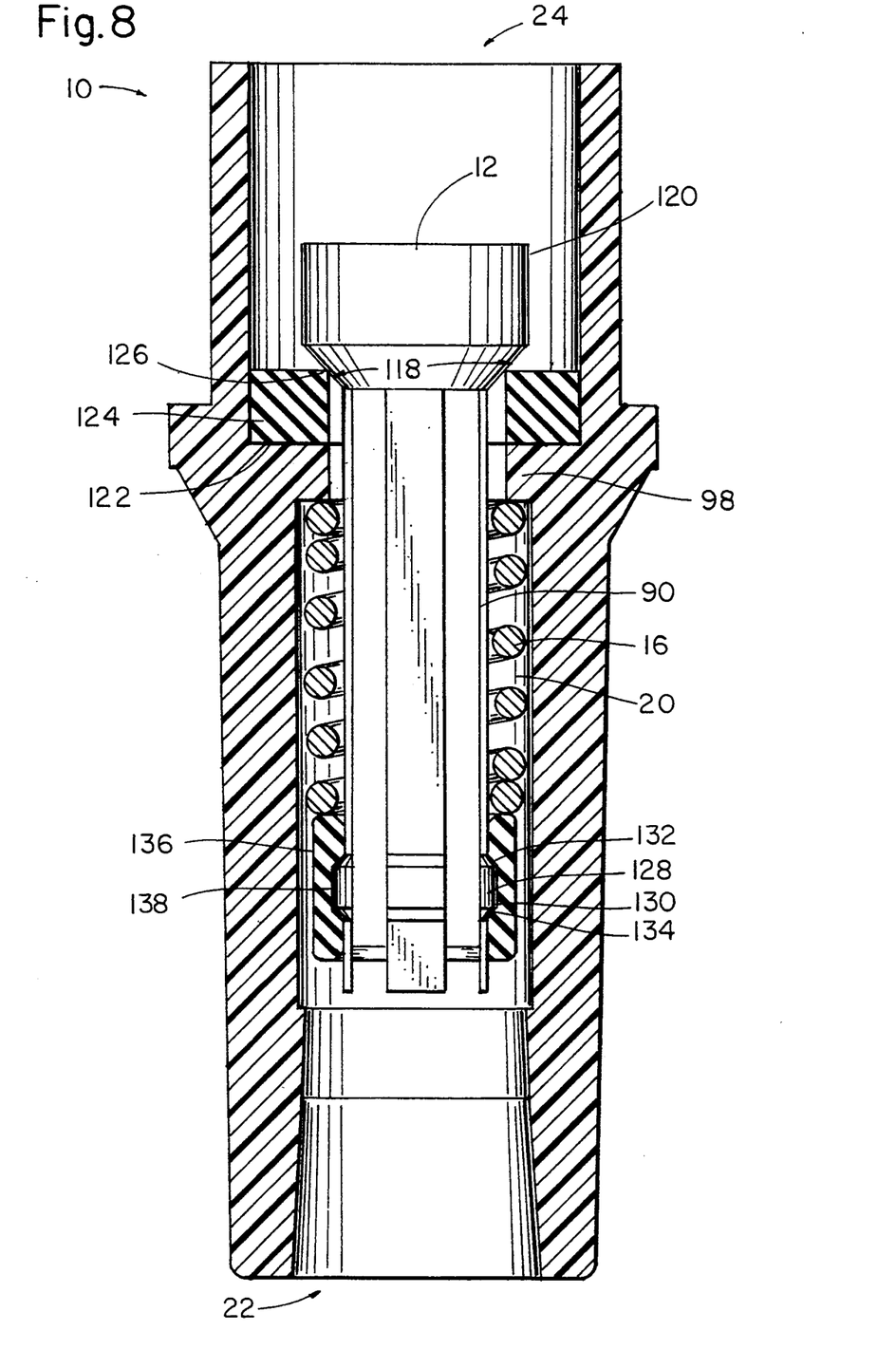
FIG. 8 is a partial cross-sectional view of another embodiment of the check valve of the invention comprising an elongated valve element operatively positioned within a valve body by means of a compression spring and a snap ring, wherein the snap ring snaps onto the input end of the elongated valve body to capture the compression spring between the snap ring and an annular protrusion extending within the valve body.

As shown in FIG. 8, another embodiment of the check valve 10 of the invention employs a compression spring 16 but eliminates the need for the apertured plug 18. Specifically, in this embodiment, the valve element 12 comprises an elongated configuration 90 having a fluted cross-sectional configuration similar to that illustrated in FIG. 7A. The rearward end of the elongated configuration 90 comprises a forwardly converging frustro-conical valve seat 118 blending into an increased diameter portion 120. The valve body 14 includes a reduced diameter portion 98 similar to that shown in FIG. 7, but including a gasket platform 122 in lieu of the annular valve seat 100. An annular gasket 124 is positioned on the gasket platform 122. As shown, gasket 124 includes an inner sharp corner 126 which sealingly engages the valve seat 118 of the valve element 12.

The input end of the valve element 12 comprises an annular protrusion 128 integrally formed therewith. The annular protrusion 128 comprises an outermost flat portion 130 with sloping sides 132 and 134. A snap ring 136, including an inner annular slot 138, is provided for snapping over the annular protrusion 128 and being securely held into position by means of the flat portion 130 engaging into the annular slot 138. In this manner, compression spring 16 may be concentrically positioned about the elongated body 90 of the valve element 12 and then captured under compression between the reduced diameter portion 98 of the valve body 14 and the snap ring 136 when the snap ring 136 is snapped into position. Once assembled in this manner, it should be appreciated that the valve seat 118 of the valve element 12 is resiliently urged into sealing engagement with the corner 126 of the gasket 124.

Valve Body With Resilient Input

FIGS. 9–13 illustrate additional embodiments of the check valve 10 of the invention wherein at least the tapered portion 22T of the input 22 of the axial passageway 20 is composed of a resilient material which accommodates a variety of sizes of syringe tips and/or variances in manufacturing tolerances to thereby form a better seal with the tip of the medical syringe when inserted therein. For the purposes of illustration in FIGS. 9–13, the components which are closely cross-hatched are composed of a resilient material whereas the components which are broadly cross-hatched are composed of a harder material. Preferably, the resilient material includes a softness substantially equal to 55 to 65 on the D scale of the Shore harness test whereas the harder material includes a hardness substantially equal to 75 on the D scale on the Shore hardness test. With regard to the specific materials, the softer material may comprise natural rubber materials, thermoplastic elastomers, thermoplastic rubbers, and silicones whereas the harder material may comprise rigid or semi-rigid thermoplastic materials. Furthermore, it shall be understood that the body 14 having a resilient input can be readily adapted to receive valve elements 12 with a large variety of embodiments. Hence, FIGS. 9–13 illustrate only the valve body 14 and not any particular type of valve element 12.

Figures 9, 11:
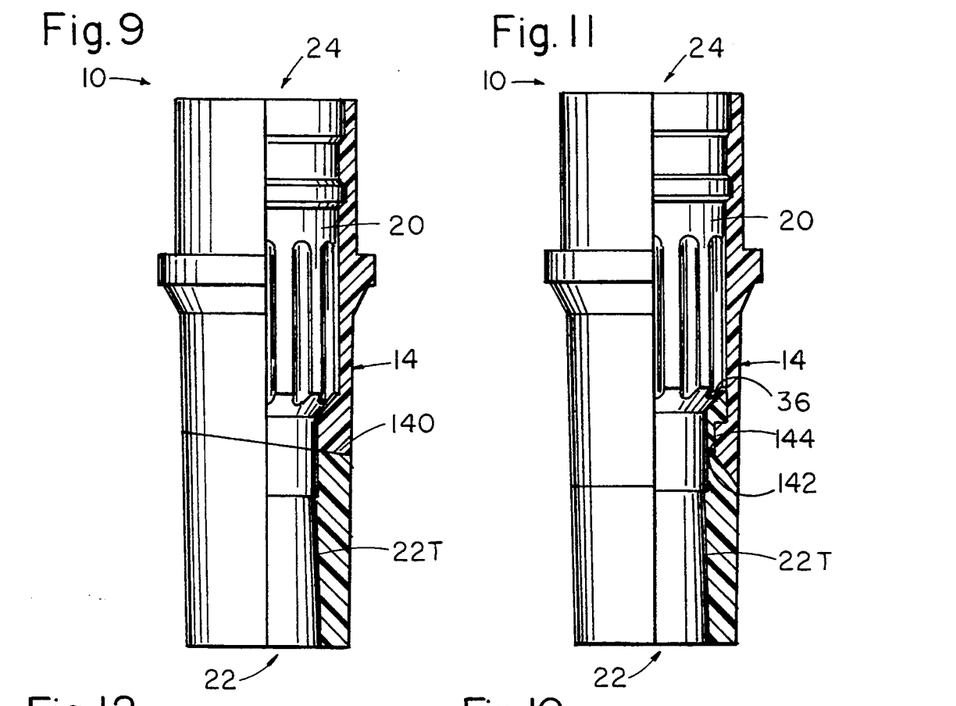

As shown in FIG. 9, one embodiment of the valve body 14 is molded by two component molding with the harder material being molded into the output 24 of the axial passageway 20 and with the resilient material being molded into the input 22 of axial passageway 20. This two-component molding occurs simultaneously so that the harder and resilient materials will bond together at seam line 140. It is noted that the positioning of the seam line 140 will be consistent and the bond good with proper operation and selection of components.

Figure 10:
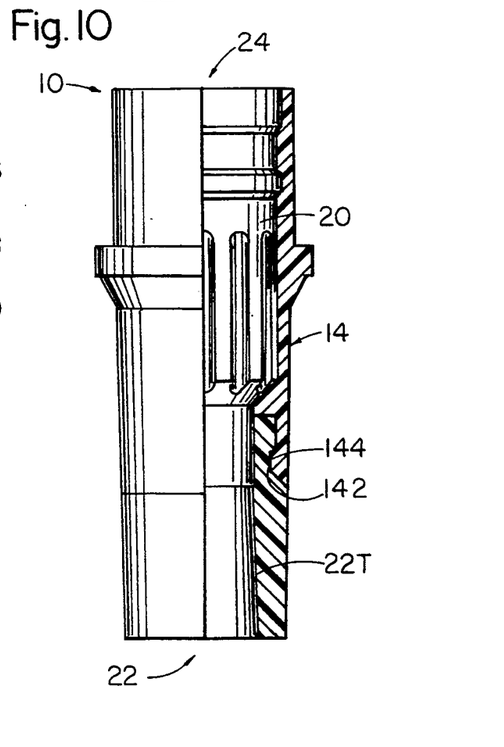

FIGS. 10 and 11 illustrate another manner in which the two-component valve body 14 may be manufactured. Specifically, in these figures it is illustrated that the input 22 of the axial passageway 20 and the output 24 of the axial passageway 20 are molded separately. In this manner, the input 22 of the axial passageway 20 is composed entirely of the resilient material and the output 24 of the axial passageway 20 is composed entirely of the harder material, The input 22 and the output 24 include an annular slot 142 and an annular protrusion 144 for snap-fitting together- In this regard, it is noted that preferably the output 24 of the axial passageway 20 composed of the harder material encompasses at least a portion of the input 22 composed of the resilient material so as to prevent unsnapping In FIG. 10, it is seen that the input 24 of the axial passageway 20 constitutes only slightly more than the input taper 22T of the axial passageway 20 to facilitate two component molding operation, whereas in FIG. 11, the input 22 comprises the input taper 22T and the valve seat 36 itself to prevent leaks between the two assembled parts.

Figure 12:
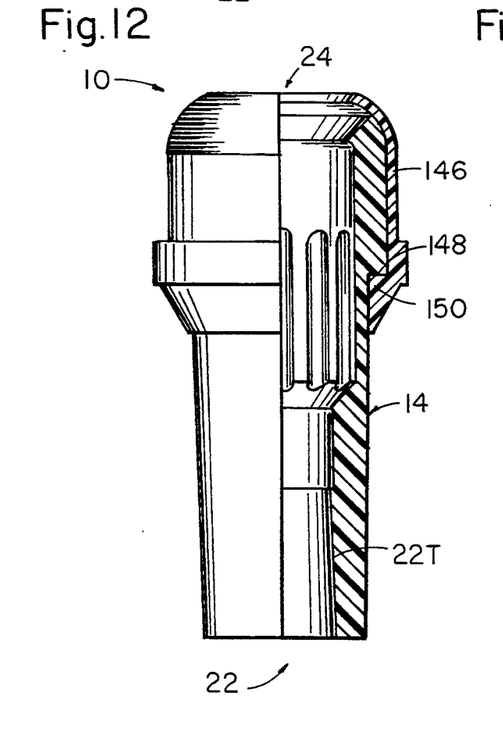

As shown in FIGS. 12 and 13, essentially all of the valve body 14 may be composed of the resilient material, with rigidity being provided by means of an outer sleeve 146 composed of a rigid material. Specifically, as shown in FIG. 12, the outer sleeve 146 may comprise a cylindrical-shaped configuration which fits over the output 24 of the valve body 14. The outer surface of the output 24 of the valve body 14 includes a sharp corner annular protrudement 148. Correspondingly, the leading end of the sleeve 146 comprises a sharp corner annular slot 150 which snaps over the corner protrudements 148. In this specific embodiment, it is noted that sleeve 146 provides rigidity about the output 24 of the axial passageway 20 so that the apertured plug 18 (not shown) is securely retained in position and does not otherwise pop-out due to the resilience of the output 24 being composed of the resilient material.

Figure 13A:
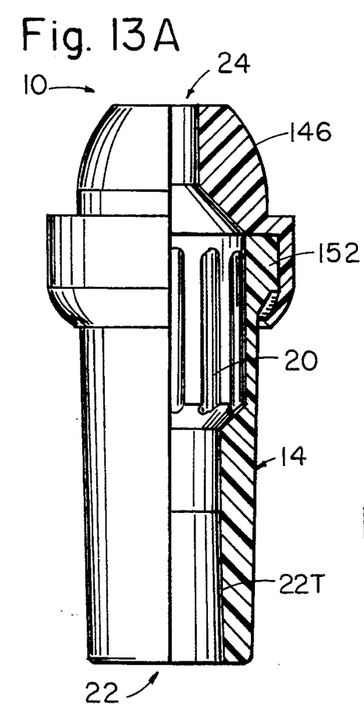
Figure 13B:
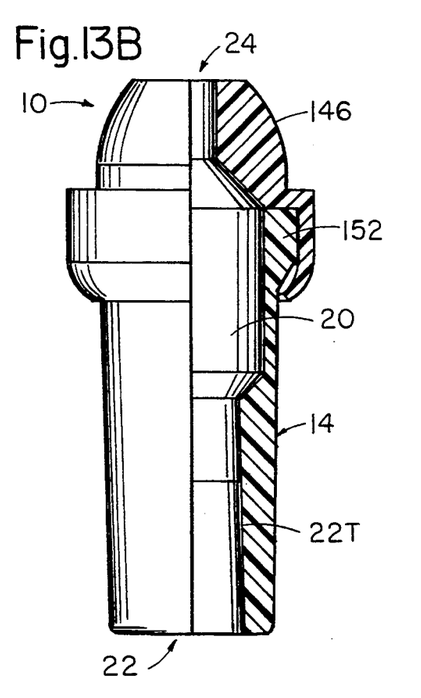

As shown in FIGS. 13A and 13B, sleeve 146 may alternatively be a crimp-type sleeve which is first slid over the output 24 of the axial passageway 20 and then crimped inwardly about an annular protrudement 152 positioned about the valve body 14. Also illustrated in this embodiment is the fact that the sleeve 146 retains the valve element 12 into position, thereby eliminating the need for the apertured plug 18.

Star-Shaped Valve Element

Figure 14:
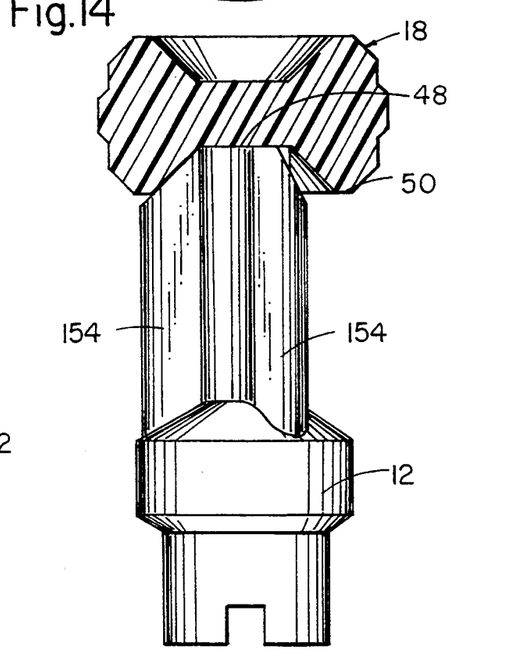
FIG. 14 is a partial cross-sectional view of a star-shaped valve element and apertured plug.
Figure 15:
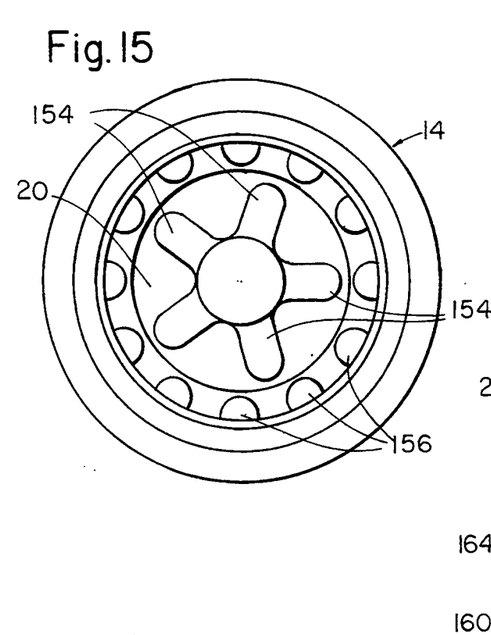
FIGS. 15 and 16 are end views of the star-shaped valve element positioned within the valve body illustrating the rounded tips of the points of the star-shaped valve element and their position with respect to the flutes positioned within the valve body.
Figure 16:
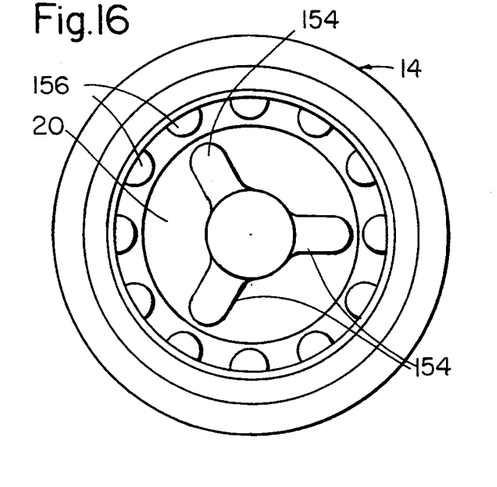

FIGS. 14–16 illustrate additional embodiments of an improved check valve 10 of the invention, wherein the valve element 12 comprises a star-shaped configuration. Specifically, unlike the square-edges of the star-configuration of the valve element shown in U.S. Pat. No. 3,831,629, the improved valve element 12 of this invention includes a star-configuration having a plurality of points wherein the edges thereof are rounded 154. As shown in FIG. 15, the star may be five-pointed or, as shown in FIG. 16, the star may be three-pointed. Importantly, the lumen of the axial passageway 20 comprises a plurality of longitudinal flutes 156. The rounded tips 154 of the points of the valve element 12 combine with the flutes 156, assure that the valve element 12 will not collapse and block the axial passageway 20 even under extreme back pressure or deformation due to syringe tip insertion. Hence, the check valve 10 may be cracked even against extreme back pressure.

Figure 14A:
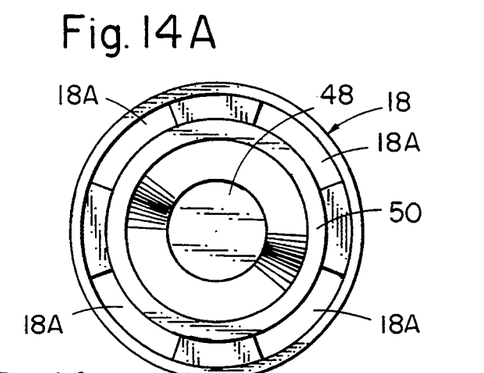
FIG. 14A is an end view of the apertured plug illustrating the apertures in the plug.

Finally, as shown in FIG. 14, the lower platform portion 48 of the apertured plug 18 is positioned inwardly of the upper platform portion 50. The end of the star-shaped valve element 12 is conically configured. In this manner, the end of the valve element 12 is centered into the lower platform portion 48 of the apertured plug 18. As seen in FIG. 14A, the apertured plug 18 comprises four apertures 18A to allow fluid flow therethrough,

Narrowed Valve Element

Figure 17:
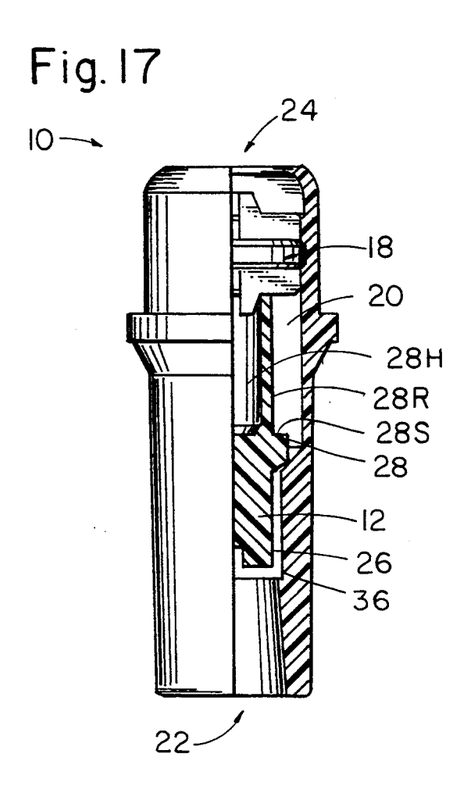
FIG. 17 is a partial cross-sectional view of another embodiment of a check valve of the invention comprising a valve element operatively positioned within a valve body by means of an apertured plug, wherein the valve element comprises a narrowed diameter to reduce the possibility of the valve element being lodged within the axial passageway of the valve body.

As shown in FIG. 17, in another embodiment of the valve element 12 of the invention, the increased diameter portion 28 of the valve element 12 is stepped inwardly at step 28S to a narrowed diameter 28R and including a blind hole 28H. This increases the gap between the narrowed diameter 28R and the lumen of the longitudinal bore 20, thereby reducing the possibility of the valve element 12 being undesirably lodged in the axial passageway 20.

Leg-Shaped Valve Element

Figure 18:
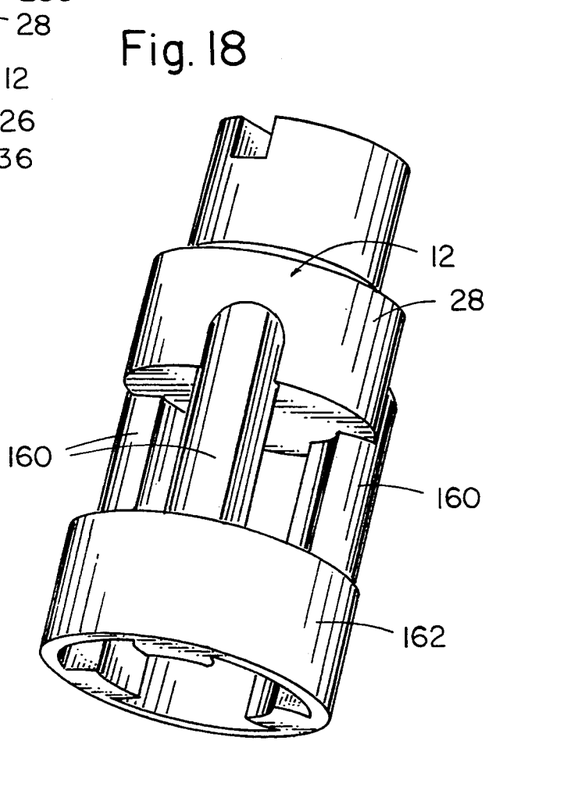
FIG. 18 is a perspective view of a leg-shaped valve element comprising a plurality of legs which extend from the valve element and which are joined at an annular ring.
Figure 19:
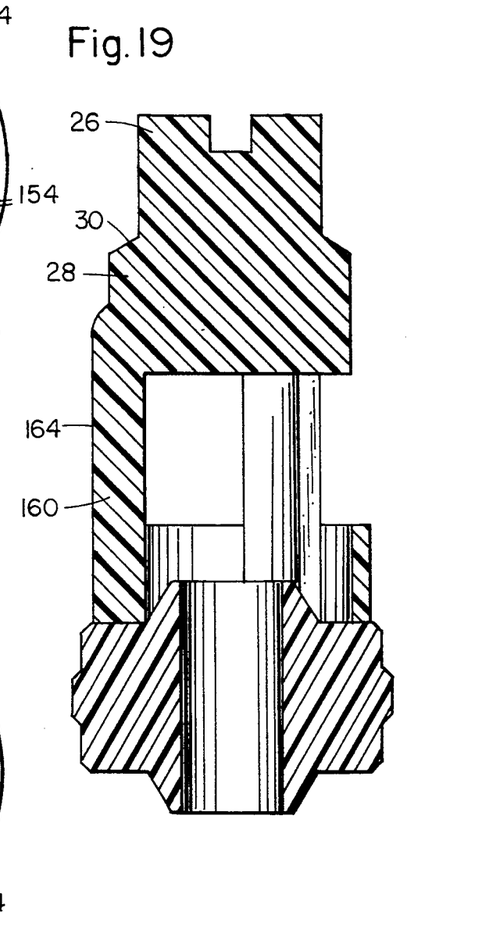
FIG. 19 is a cross-sectional view of FIG. 18 coupled with an apertured plug.

FIGS. 18 and 19 illustrate still another embodiment of an improved valve element 12 wherein the valve element comprises a legged configuration. Specifically, the improved valve element 12 of this embodiment comprises a plurality of legs 160 (e.g. three) which extend from the increased diameter portion 28 of the valve element. The feet of the legs 160 are joined at an annular ring 162. Preferably, as best shown in FIG. 19, the legs 160 and the annular ring 162 are integrally formed of a resilient material with the outermost surface 164 of the legs 160 extending beyond the increased diameter portion 28 and being flush with the outermost surface of the ring 162. This arrangement functions to center the valve element 12 within the axial passageway 20 when the element 12 is positioned therein, yet allows substantially free flow of fluid around the increased diameter portion 28, then among the legs 160, and then through the hole 166 formed by the ring 162. Notably, the resiliency of the legs 160 permits the check valve 10 to be cracked with the tip of a medical syringe or the like without any blockage of the flow of fluid through the valve.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A check valve, comprising in combination:
   an elastomeric valve body having a central axial passageway therethrough defining an input and an output and having valve seat means therein;
   an elastomeric valve reciprocatingly positioned within said axial passageway, said valve element having valve seat means in sealingly engageable position with said valve seat means of said valve body when said valve element is urged forwardly toward said input;
   an elastomeric apertured plug positioned within said output of said axial passageway, said apertured plug comprising a symmetrical design allowing said plug to be positioned within said output irrespective of which end of said plug is inserted therein, said plug comprising an annular ring and a vane positioned diametrically across said ring to define an aperture between said vane and said annular ring; an inward edge of said vane comprising a lower annular platform portion and an upper annular platform portion with sloping sides therebetween allowing said compression spring to be seated upon said lower annular platform portion and sloping sides and centered within said axial fluid passageway by means of said upper annular platform portion, said valve element comprising a reduced diameter portion and an increased diameter portion joined together at a forwardly converging frusto-conical valve seat defining said valve seat means allowing said compression spring to be seated thereon, said valve element comprising a rearward end including a lower annular platform portion and an upper annular platform portion with sloping sides therebetween allowing said compression spring to be seated upon said lower annular platform and sloping sides portion and centered within said axial passageway by means of said upper annular platform portion of said valve element; and a metal compression coil spring positioned within said axial passageway between said valve element and said apertured plug, whereby said valve element is urged forwardly toward said input.

* * * * *